United States Patent
Van Den Griend et al.

(10) Patent No.: US 8,444,459 B2
(45) Date of Patent: May 21, 2013

(54) DEVICE AND METHOD FOR SCALDING POULTRY

(75) Inventors: Erik Jan Van Den Griend, Oss (NL); Johannes Gerardus Maria Gerrits, Rijkevoort (NL); Maurice Eduardus Theodorus Van Esbroeck, Bemmel (NL); Adrianus Josephes Van De Nieuwelaar, Gemert (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 981 days.

(21) Appl. No.: 12/374,926

(22) PCT Filed: Jul. 12, 2007

(86) PCT No.: PCT/NL2007/050347
§ 371 (c)(1),
(2), (4) Date: Feb. 24, 2009

(87) PCT Pub. No.: WO2008/013447
PCT Pub. Date: Jan. 31, 2008

(65) Prior Publication Data
US 2009/0215368 A1     Aug. 27, 2009

(30) Foreign Application Priority Data
Jul. 24, 2006    (NL) ........................... 2000158

(51) Int. Cl.
*A22B 5/08*         (2006.01)
(52) U.S. Cl.
USPC .......................................................... 452/77

(58) Field of Classification Search
USPC ........................................................ 452/74–77
See application file for complete search history.

(56) References Cited

U.S. PATENT DOCUMENTS

| | | | | | |
|---|---|---|---|---|---|
| 2,830,318 | A | * | 4/1958 | Zebarth | 452/80 |
| 3,074,103 | A | * | 1/1963 | Roth et al. | 452/77 |
| 3,561,040 | A | * | 2/1971 | Floden | 452/77 |
| 3,703,021 | A | | 11/1972 | Sharp | |
| 3,703,744 | A | * | 11/1972 | Dillon | 452/73 |
| 3,729,773 | A | * | 5/1973 | Dillon | 426/524 |
| 3,744,088 | A | * | 7/1973 | Snowden | 452/77 |
| 3,748,691 | A | * | 7/1973 | Snowden | 452/77 |
| 4,196,221 | A | * | 4/1980 | Dew | 426/235 |
| 4,388,811 | A | * | 6/1983 | Zebarth | 62/63 |
| 4,852,215 | A | * | 8/1989 | Covell, III | 452/79 |
| 4,862,557 | A | * | 9/1989 | Clayton et al. | 99/534 |
| 4,868,950 | A | * | 9/1989 | Harben, Jr. | 452/77 |
| 4,944,068 | A | * | 7/1990 | Covell, III | 452/80 |

FOREIGN PATENT DOCUMENTS

| | | |
|---|---|---|
| EP | 0 140 300 A2 | 5/1985 |
| EP | 0 381 609 A1 | 8/1990 |
| EP | 1 297 748 A1 | 4/2003 |
| WO | WO-02/098239 A1 | 12/2002 |

* cited by examiner

Primary Examiner — Richard Price, Jr.
(74) Attorney, Agent, or Firm — Birch, Stewart, Kolasch & Birch, LLP

(57) ABSTRACT

The invention relates to a device for scalding poultry, comprising: a processing space provided with transport means for carrying the poultry for processing through the processing space, a conditioning space connecting to the processing space for composing a conditioning medium, and displacing means for displacing the conditioning medium from the conditioning space to the processing space. The invention also relates to a method for scalding poultry.

28 Claims, 6 Drawing Sheets

DEVICE AND METHOD FOR SCALDING POULTRY

Figure 1A:
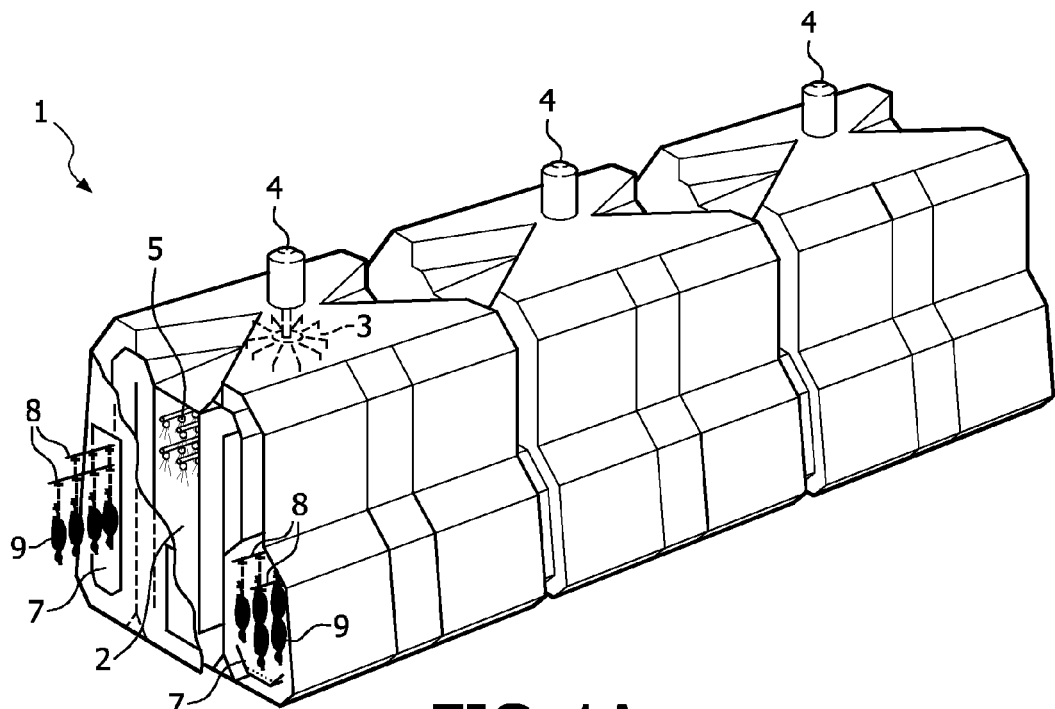

The present invention relates to a device for scalding poultry. The present invention also relates to a method for scalding poultry.

The scalding of poultry, and more particularly slaughtered and bled poultry such as chickens, ducks and turkeys, has the purpose of reducing the attachment of the feathers to the carcass, such that removal of the plumage during a subsequent (plucking) process becomes simpler. A prerequisite for scalding is that scalding must be completed shortly after poultry has been slaughtered because of the rapid onset of rigor mortis. Partially because of the desired speed use has heretofore usually been made of a basin with warm water in which the poultry is immersed. After a treatment time of about 3 minutes the poultry is taken out of the basin and the feathers can be removed relatively easily. A drawback of this so-called "immersion scalding" is that the poultry entrains a considerable amount of water from the basin, and there is also the problem of possible transfer of dirt, germs and bacteria from the basin.

An alternative method of scalding is described in U.S. Pat. No. 3,703,021. Here the poultry is pre-plucked, i.e. a substantial part of the feathers is already removed such that the poultry to be scalded is already almost bald, and that the pre-plucked poultry is then carried through a processing space in a time period of 30 to 40 seconds. Steam-heated liquid is blown into this processing space with air as carrier medium. A uniform temperature, a 100% air humidity and an excess of liquid can thus be maintained in the processing space. The process conditions are monitored and maintained by detection means and control means co-acting therewith. It has been found difficult in practice to obtain a constant and effective scalding result with this method. A main quality criterion is of course the extent to which the feathers are loosened. Other factors determining the quality of scalding are the degree of damage to the epidermis (surface epithelium/dermis) and the degree of denaturation ("boiling down") of proteins in the meat directly under the skin. At least all these aspects must be taken into account in quality control of the scalding process.

It is the object of the invention to provide an improved method of scalding as well as the means required for this purpose, whereby an effective scalding result can be obtained quickly and without the risk of cross-contamination while retaining the advantages of the prior art.

The present invention provides for this purpose a device for scalding poultry comprising a full plumage, comprising: a conditioning space for composing a scalding medium with a dew point lying in the range of [49-61]° C., a processing space provided with transport means which define a transport path for the poultry leading through the processing space, and dispensing means for the scalding medium connecting the conditioning space to the processing space and provided with at least one outlet opening which is directed toward the transport path and with which the composed scalding medium is carried from the conditioning space into the transport path, as a result of which liquid from the scalding medium condenses onto the poultry, and more particularly onto the skin of the poultry. A targeted condensation of the scalding medium will thus occur at the position where the jet of scalding medium strikes the skin of the poultry. The important advantage of condensation is that it allows a very considerable heat transfer in a relatively short time without the risk of (local or other) overheating ("overscalding") of the poultry. Excess damage to the epidermis (surface epithelium) of the slaughtered animals can thus be prevented. After all, not only is a great heat transfer realized as a result of the condensation, but the temperature of the poultry will also not exceed the wet bulb temperature, at least as long as the skin has not dried up as a result of evaporation or as long as the liquid on the skin is not heated any further. Both ways of exceeding the wet bulb temperature require a considerable energy transfer which, because of the limited capacity of air heating (since the more rapid heat transfer resulting from condensation is no longer possible), will be less likely to occur. The scalding process according to the present invention thus has a built-in safeguard against excessive heating of the poultry. Dispensing means are very generally understood to mean supply means intended for directed supply of the scalding medium; the dispensing means may optionally be provided with control means if desired. Another significant advantage of the present invention is therefore that the condensation can be performed in targeted manner; the scalding medium will thus be blown at least partially underneath the feathers. To this end the jet (or jets) of scalding medium will in particular have to be brought into contact with the poultry in a manner aimed against the direction of implant of the feathers; the scalding medium will thus penetrate the feathers and at least partially reach the skin. It thus becomes possible to scald poultry without immersion in liquid and without first removing a part of the feathers. Carrying the scalding medium into the transport path (i.e. the path followed by the poultry) in directed manner, which of course implies that the scalding medium is also fed directly targeted at the poultry, results in an unexpectedly great advantage. Targeted condensation resulting from one or more jets of scalding medium makes it possible to obtain a controlled and desired scalding result without pretreatment (pre-plucking) of the poultry, in extremely efficient manner (quickly) and with a process-inherent safeguard against excessive heating of the poultry. This means that sufficient loosening of the feathers can be coupled to acceptable damage to the epidermis which can be classified as "low scald", "intermediate scald" or "high scald" and a minimal degree of denaturation of the poultry meat.

Another significant advantage is that a very favourable scalding result can thus be obtained; scalding can be performed with the device according to the present invention in "intelligent" manner by targeting determined positions on the skin of the poultry less than other positions, for instance with the intention that the feathers at least substantially come loose everywhere with the same resistance. This is not otherwise essential. If a subsequent process (such as more particularly plucking) requires a specific variation in the attachment of the feathers over the carcass of a poultry animal, this can then be achieved with the device according to the invention. It is possible here to envisage for instance scalding a poultry animal such that, at locations which are less readily accessible for plucking, the feathers are less firmly attached than at locations where plucking is simpler. Partly due to the absence of a basin filled with liquid, the device can moreover be embodied such that it can be cleaned effectively and efficiently.

In respect of the scalding medium that can be applied, heated air is in the first instance envisaged which has a dew point in the range of [49-61]° C. and which is at least partially or almost fully saturated with water. Other carrier gases or gas mixtures can however also be applied. It is also the case for the liquid that alternative liquids or liquid mixtures can be applied instead of water. The device according to the present invention is not limited in respect of the composition of the scalding medium to be applied therein.

The dispensing means for carrying the scalding medium into the transport path are preferably provided with at least one adjustable outlet opening. Using such an adjustable outlet opening it is possible to select the optimal direction and form of the jet of scalding medium. The form, starting position, length and direction of the jet of scalding medium can be modified subject to situational conditions. The device can thus be adapted to treat different types of poultry, for different batches of the same poultry animal, or even per individual slaughtered animal for scalding. For adjustment of the outlet opening(s) at individual level, and optionally also in the case of adjustment for different group of slaughtered animals, it can be advantageous to automate displacement of the outlet opening, for instance by incorporating at least one sensor (envisage a camera system in particular) and a drive coupled to the sensor and a control system for displacing the outlet opening(s) at the command of the control system. The dispensing means for the scalding medium can here comprise for instance at least one nozzle.

In order to prevent the scalding medium falling below the condensation temperature on the path which must be covered from the conditioning space to the poultry, it is advantageous if the dispensing means for the scalding medium comprise heating. This can also be advantageous when use of the device temporarily ceases; condensation of the scalding medium in the dispensing means can then be prevented by activating the heating.

The processing space can be embodied as a substantially tunnel-like space. An overhead conveyor as frequently used in poultry slaughterhouses and provided with poultry holders displaceable along the overhead conveyor can be readily carried through such a processing space. The poultry can be suspended by the legs from the poultry holders and thus pass through a transport path defined by the overhead conveyor, and is readily accessible for the feed of scalding medium. At least a part of the dispensing means is here preferably disposed relative to this transport path such that the dispensing means bring a part of the scalding medium into targeted contact with the wings, in particular the underside of the wings of the poultry. The "underside of the wings" is here understood to mean the part of the wing situated on the underside of the wing when a poultry animal is standing on its legs; since during transport through the processing space the poultry is often suspended upside down from the legs, in this situation the underside of the wing will, conversely, be situated on the top side. Bringing the scalding medium into targeted contact with the wings does not otherwise have to be the case along the whole length of the transport path; it is also possible for the scalding medium to come into targeted contact with the underside of the wings of the poultry along only a part of the length of the transport path. It is found in practice that the feathers on the wings of the poultry are particularly difficult to remove; it is precisely for this reason that scalding is expressly undertaken at the position of the wings.

The conditioning space for composing the scalding medium is desirably provided with at least one evaporation space with a feed for liquid. The conditioning space for composing the scalding medium can be embodied even more advantageously with at least two evaporation spaces placed in line, both provided with a feed for liquid, wherein the feed for liquid on the first in-line evaporation space is adapted for operation at a higher temperature than the second evaporation space. For the purpose of conditioning the scalding medium, and more particularly for adjusting the dew point, use can be made of for instance a washer as per se known from the prior art. The advantage of two (or even more than two) evaporation spaces running into each other is that an accelerated evaporation process can first be followed at a higher temperature and that the fine adjustment of the dew point takes place only in the final part of the evaporation process. An example of such a staged process consists of a first step of steam injection and a second step in which a determined medium temperature is set accurately with a 100% air humidity. The process time for conditioning the scalding medium can thus be shortened.

In order to displace the scalding medium from the conditioning space to the processing space the device can be provided with at least one fan, also referred to as blower or ventilator. It is further desirable that the processing space be provided with discharge means for discharging from the processing space condensation and/or gas/liquid mixture which is not (any longer) correctly conditioned. In order to limit the liquid consumption of the device the discharge means of the processing space can feed back at least partially to the conditioning space. In order to prevent scalding medium flowing outside from the processing space at the position where the poultry enters the processing space or at the position where the poultry leaves the processing space, a sluice construction can be applied. Not only is it thus possible to prevent a substantial quantity of scalding medium disappearing (limiting leakage), but the entry of ambient air into the processing space can also be limited in this way. This results in an improved controllability of the process conditions in the processing space. In a possible embodiment variant of a sluice construction upstream of the processing space the feed track leads upward when entering the processing space and leads downward again when leaving the processing space. At the position of the processing space the transport path thus lies in a higher position than in the vicinity of the processing space; because the warm scalding medium will tend to want to displace upward, leakage of scalding medium out of the processing space can thus be limited.

In order to automate the operation thereof, the device can also be provided at other locations, as already described above with reference to the displacement of the dispensing means for liquid in the processing space, with at least one sensor and a control communicating with the sensor. It is possible here to envisage for instance control of the composition of the scalding medium (time, quality and/or volume), the feed of heated liquid (time, quality and/or volume), the transporting speed of the poultry, the drive of the fan and so forth.

The present invention also relates to a method for scalding poultry, comprising the processing steps of: A) composing a scalding medium with a dew point lying in the range of [49-61]° C.; B) carrying into a processing space poultry for scalding which comprises full plumage; and C) supplying the scalding medium to the processing space such that at least one jet of the scalding medium is formed which is directed at the poultry. By means of this method the advantages as already described above with reference to the device according to the present invention can be achieved, such as, among others, a controlled, safe and improved scalding result. Other advantages are, among others, an efficient energy consumption and a reduced chance of cross-contamination/fouling. The dew point of the scalding medium lies in the range of [49-61]° C., preferably in the range of [49-53]° C., of [53-57]° C. or of [57-61]° C. It is precisely in these processing conditions that scalding results will be obtained causing epidermal damage specified respectively as low scald, intermediate scald and high scald. It is also of great importance here that a set dew point can be maintained within any of the above stated ranges within a limited margin of more or less 1° C., preferably even a margin of more or less 0.5° C. It is thus possible to keep the variations in the scalding result acceptably low.

In order to prevent premature condensation of the scalding medium, the scalding medium is preferably 90-100% saturated, more preferably 95-100% saturated when it enters into contact with the poultry during processing step C). Optimum use is thus made of the possibility of heat transfer as a result of condensation. In addition, there will be hardly any drying-out at all of the poultry for scalding during the scalding process in view of the relatively high degree of saturation of the air. (Undesirable) exceeding of the wet bulb temperature will therefore also be prevented.

The jet of scalding medium is advantageously specifically directed at the neck, the wings, the belly and/or the tail of the poultry during processing step C). Defeathering is relatively difficult at these particular locations. In order to compensate for differences in shape in different batches (groups) of poultry, the jet of scalding medium can be set per batch of poultry to be processed. In the case of large differences in shape and size of the poultry for processing it is even possible to opt for having such a setting take place on individual basis.

A jet of scalding medium with a dew point lying in the range of [49-61]° C. comes into contact with the epidermis of the poultry, and in a preferred variant the scalding medium has a temperature which is not much higher than said range of [49-61]° C., so that the chance of overheating of the skin of the poultry can be reduced still further. However, in order to have the process progress sufficiently quickly and to prevent premature condensation, it is still also possible to opt deliberately for operation with a scalding medium having a temperature higher than 60° C., for instance 62° C.

This makes it possible with the method according to the present invention to limit the treatment time of the poultry, more particularly chickens, in the processing space to [60-180] seconds. It will be apparent that a reduction in the processing duration is also possible in the case of poultry other than chickens, such as for instance turkeys and ducks. In order to obtain a uniform scalding result it can also be advantageous for an airflow to be generated in the processing space. It must also be taken into account here that this can result in a wet bulb temperature of the outer side of the poultry on which condensation has taken place which is a fraction lower than the condensation temperature. Discharge of condensed water out of the processing space prevents this water impeding the poultry treatment process. Reuse of the condensed water is possible by using this water once again to compose the scalding medium. Water consumption is thus reduced considerably.

Figure 1B:
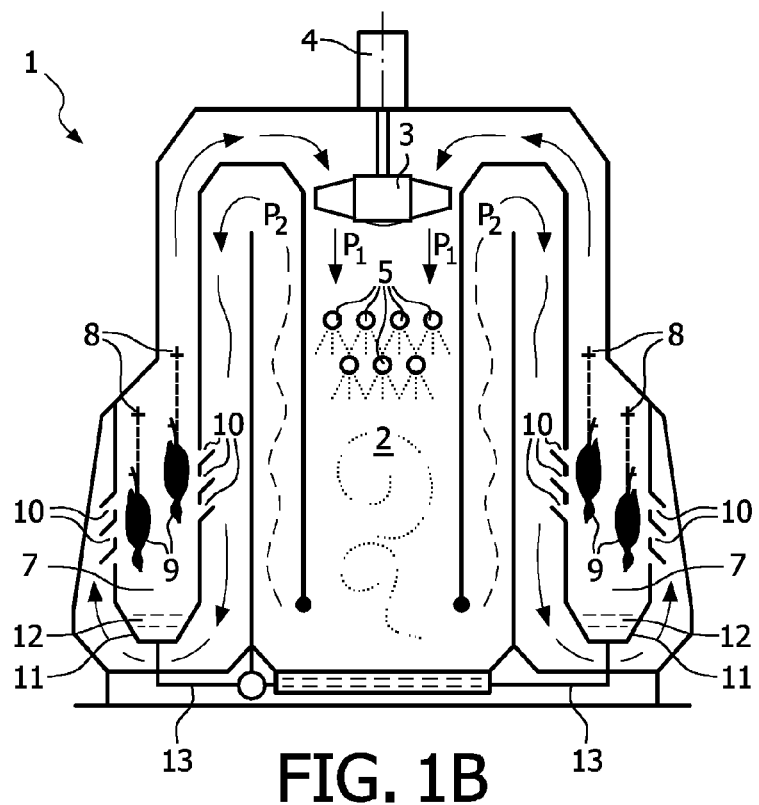
Figure 2A:
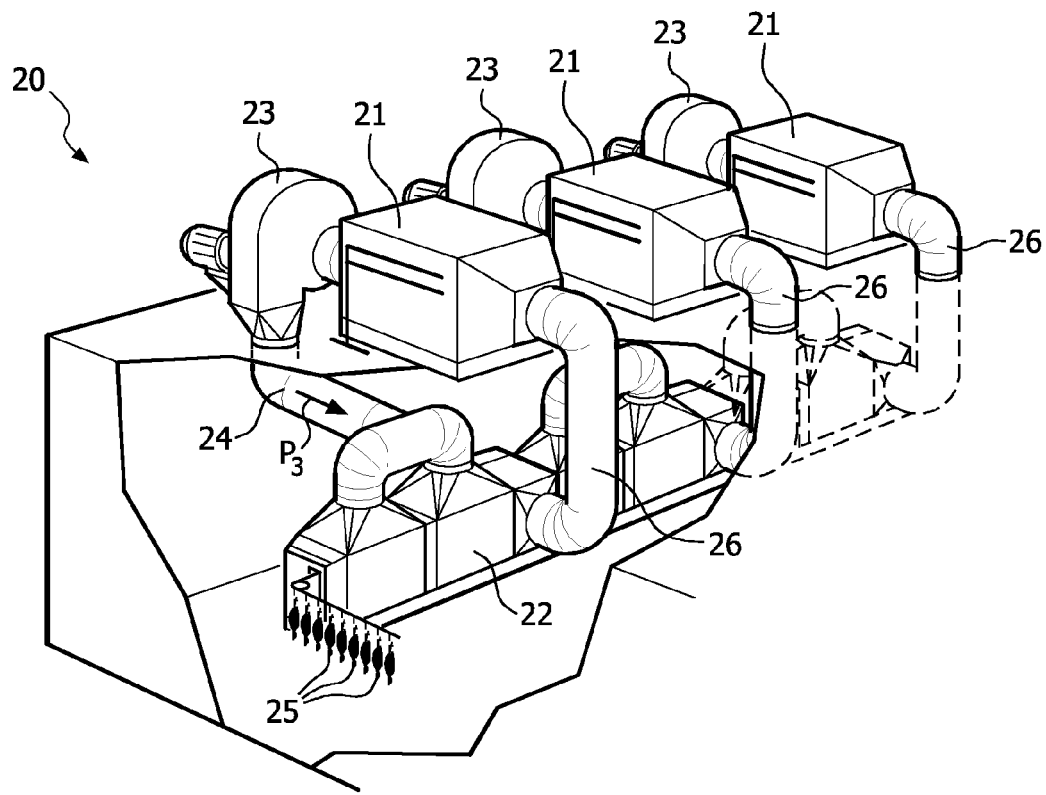
Figure 2B:
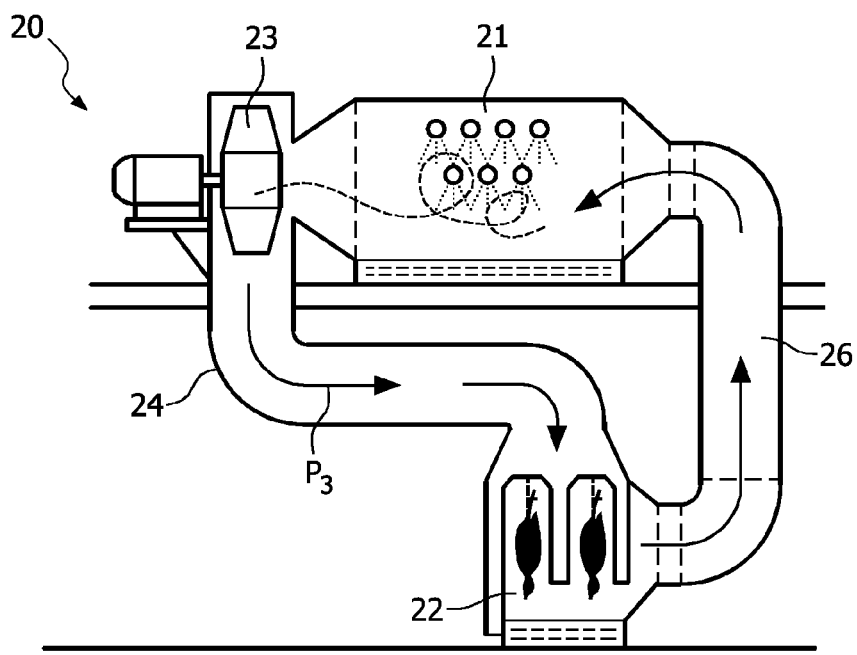
Figure 3:
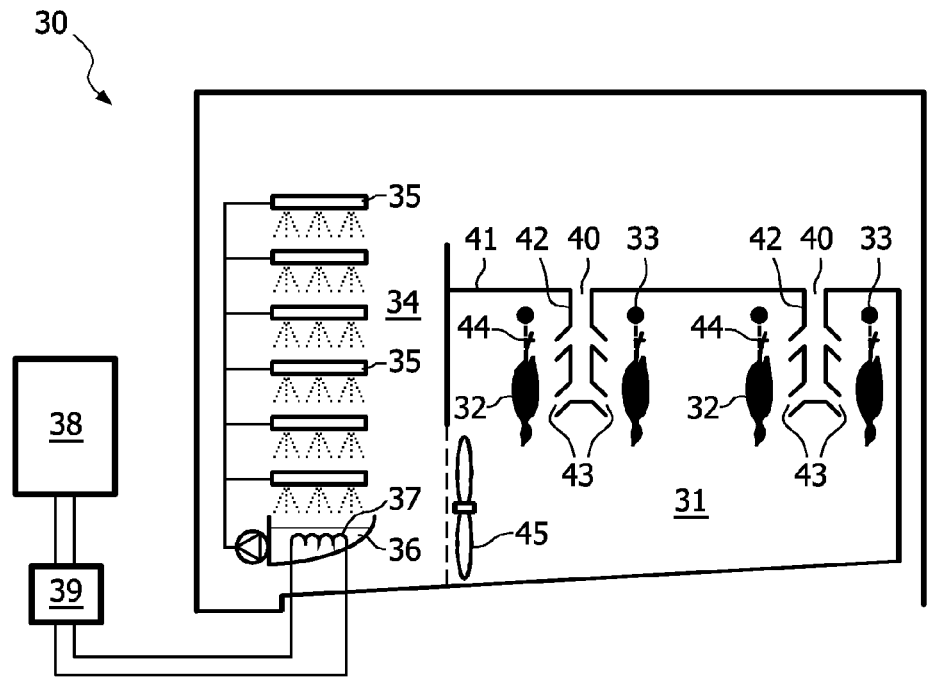
Figure 4:
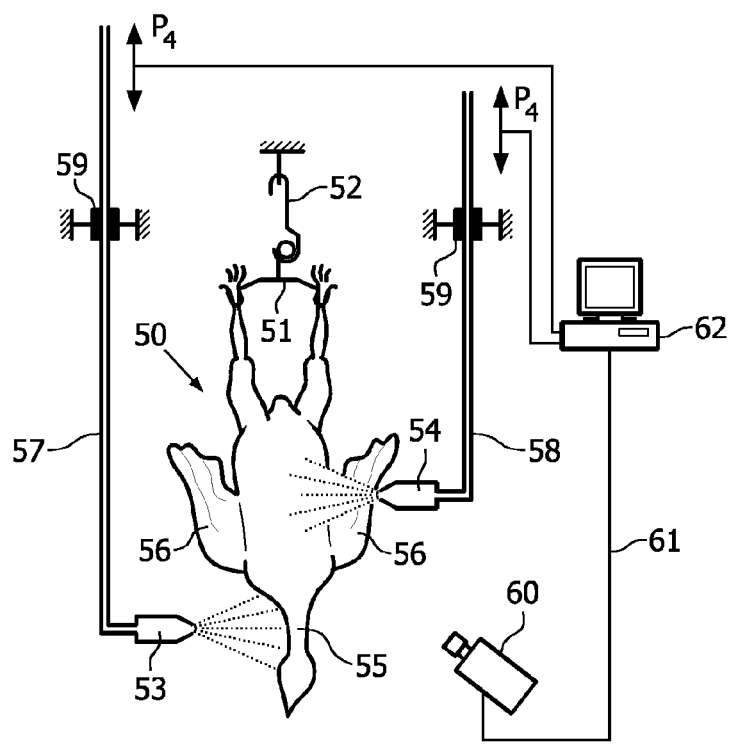
Figure 5:
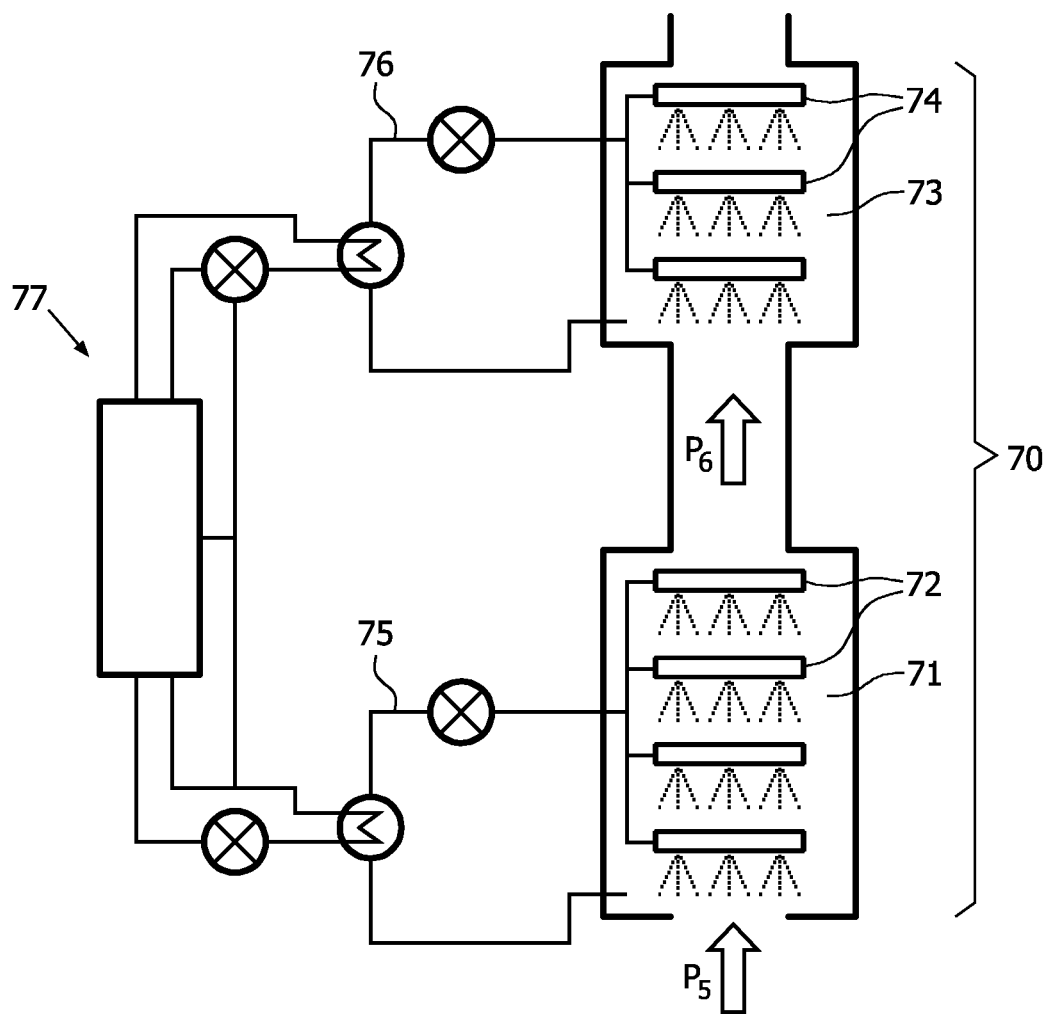
Figure 6A:
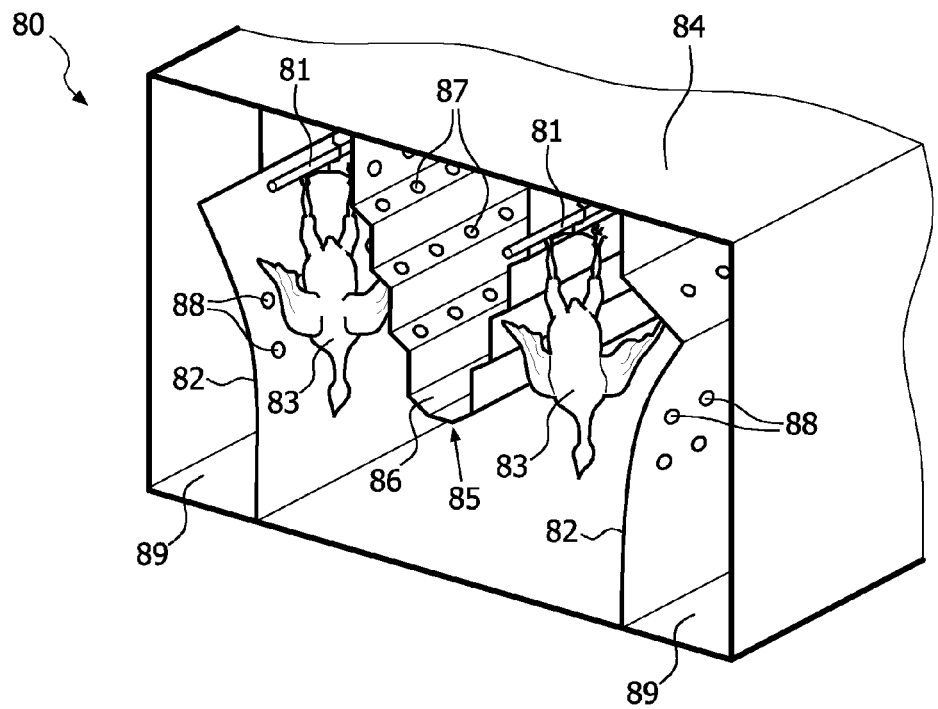
Figure 6B:
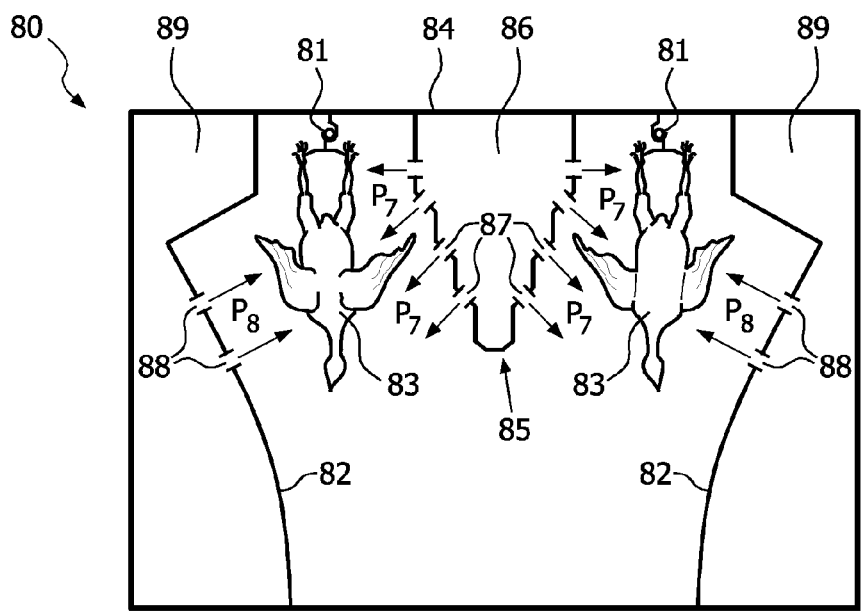
Figure 7:
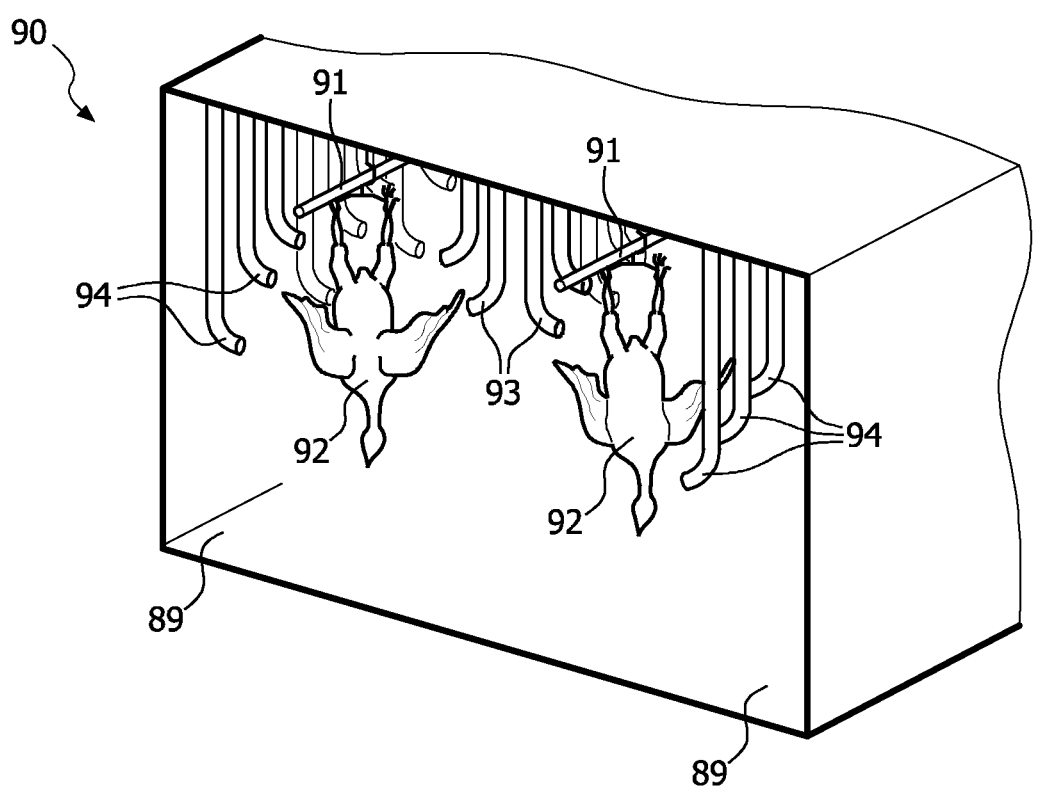

The present invention will be further elucidated on the basis of the non-limitative exemplary embodiments shown in the following figures. Herein:

FIG. 1A shows a perspective view of a first embodiment variant of a device according to the present invention, FIG. 1B shows a cross-section through the device of FIG. 1A, FIG. 2A shows a perspective view of a second embodiment variant of a device according to the present invention, FIG. 2B shows a cross-section through the device of FIG. 2A, FIG. 3 shows a cross-section through a schematically represented third embodiment variant of a device according to the present invention, FIG. 4 shows a view of a slaughtered poultry animal being scalded in accordance with the method according to the present invention, FIG. 5 is a schematic representation of a conditioning space for producing a scalding medium with a dew point lying in the range of [49-61]° C., FIGS. 6A and 6B show two views of an alternative embodiment variant of a processing space of a device according to the present invention, and FIG. 7 is a perspective view of yet another alternative embodiment variant of a processing space of a device according to the present invention.

FIGS. 1A and 1B show an integrated scalder 1 with a centrally located generator or conditioning space 2 to which gas (air) is fed via the top side as according to arrows $P_1$ by fans 3 driven by electric motors 4. Liquid washers 5 are disposed in conditioning space 2 for bringing a scalding medium to the correct temperature and saturation level. The scalding medium is carried as according to arrows $P_2$ to processing spaces 7 located on either side of conditioning space 2. Situated in processing spaces 7 are overhead conveyors 8 along which the poultry 9 for scalding is displaced hanging by the legs. The scalding medium is now blown through openings 10 in a partition wall in a manner directed into the path in which poultry 9 is being advanced. Also situated in processing spaces 7 are collecting basins 11 with which excess condensation 12 in processing spaces 7 can be collected and discharged via conduits 13 for reuse in conditioning space 2 (recirculation). For the purpose of recirculation of the collected scalding medium it is desirable that, prior to being reused, it is conditioned such that at least a substantial part of the bacteria present are killed. This is possible for instance by heating the collected scalding medium to a temperature higher than 60° C., preferably a temperature higher than 65° C.

FIGS. 2A and 2B show an alternative scalder 20 with conditioning spaces (generators) 21 located at a distance from a processing space 22. A scalding medium with a dew point lying in the range of [49-61]° C. is carried by means of fans 23 through tubes 24 to processing space 22 as according to arrows $P_3$. Scalding takes place in processing space 22, wherein the poultry for scalding 25 is carried in processing space 22 through scalding medium supplied through tubes 24 by means of jets directed at the poultry for scalding. The mixture discharged from processing space 22 is fed back by means of return conduits 26 to conditioning spaces 21. The advantage of the scalder 20 shown in FIGS. 2A and 2B is that conditioning spaces 21 can be placed at a distance from processing space 22 such that a production space can be utilized optimally. The modular construction of the system also provides advantages in production (purchasing), transport, placing and maintenance.

FIG. 3 shows a cross-section through a schematically represented scalder 30 with a processing space 31 through which poultry 32 is carried in four rows along overhead conveyors 33. In a conditioning space 34 adjacent to processing space 31 a scalding medium is brought by washers 35 and a basin 36 with heating 37 to a desired dew point lying in the range of [49-61]° C. and a desired temperature. For this purpose the washers 35 and basin 36 are connected to a hot water boiler 38, and the whole conditioning process is controlled by a control 39. The scalding medium created in conditioning space 34 is blown through conditioning space 34 by a fan 45 and then blown through openings 40 in a plate 41 into blow pipes 42. The scalding medium leaves blow pipes 42 through nozzles 43 arranged for this purpose at specific heights. The position of nozzles 43 is such that the jets of scalding medium leaving nozzles 43 are aimed directly at the paths through which poultry 32 is passing. Since poultry 33 hangs downward by legs 44 and nozzles 43 are also directed downward, the scalding medium will penetrate relatively easily under the feathers of poultry 32. Once it has been in contact with poultry 32, the scalding medium present in processing space 31 will be discharged again by fan 45 and reconditioned in conditioning space 34 to a scalding medium with a desired dew point lying in the range of [49-61]° C. and a desired temperature.

FIG. 4 shows a slaughtered chicken 50 which is suspended in a holder 51 on an overhead conveyor 52 in a processing space not further shown in this figure. For the purpose of supplying a scalding medium with a dew point lying in the range of [49-61]° C. such that this is aimed directly at chicken 50, spray heads 53, 54 are placed in the processing space, in particular such that the neck 55 and wings 56 of chicken 50 are scalded more intensively than the other parts of chicken 50. The position of spray heads 53, 54 is vertically displaceable (see arrows $P_4$). Feed conduits 57, 58 for scalding medium coupled to the respective spray heads 53, 54 are slidable in guides 59 for this purpose. The positioning of spray heads 53, 54 can be automatically optimized by means of a camera 60, the signal from which is carried by a signal line 61 to a control unit 62. This control unit 62 subsequently controls the position of spray heads 53, 54 by means of control lines 63.

FIG. 5 shows a schematically represented staged conditioning space 70 which consists of a first chamber 71 to which a gas for saturating is fed as according to arrow $P_5$. In chamber 71 are placed washers 72 which are operated at a relatively higher temperature than that which the scalding medium ultimately has to have. Before the medium in chamber 71 reaches the operating temperature of washers 72, this preheated scalding medium is carried further as according to arrow $P_6$ to a second chamber 73 with washers 74. These washers 74 operate at a lower temperature than washers 72 in first chamber 71. A considerable saturation and temperature increase of the medium can thus be rapidly realized in first chamber 71, for instance by steam injection, while the fine adjustment of a precisely determined dew point is brought about in second chamber 73 For supply to washers 72, 74 respective independent circulation systems 75, 76 can be supplied by a combined supply system 77 which is shown only very generally.

FIG. 6A shows a perspective view of an alternative embodiment variant of a processing space 80 of a device according to the present invention, while FIG. 6B shows the cross-section through this processing space 80. Two transport paths 81 for poultry 83 here enter processing space 80 parallel to each other. The standing side walls 82 of processing space 80 are formed such that the volume of processing space 80 is limited without this limiting the possible throughfeed of poultry 83. A smaller volume of processing space 80 has the advantage that the process conditions in processing space 80 can be better controlled and that the scalding medium is employed more effectively. A blower unit 85 is placed centrally on the upper side 84 of processing space 80 midway between transport paths 81, whereby the volume of processing space 80 is limited still further. The hollow interior 86 of blower unit 85 also functions as feed channel for the scalding medium, and openings 87 are arranged in the wall of blower unit 85 such that the supplied scalding medium exits as according to arrows $P_7$ (see FIG. 6B) in a direction toward poultry 83. In this way it is also possible in advantageous manner to blow on the socks (i.e. the feathers connecting to the legs) of poultry 83. In similar manner openings 88 are also arranged in the standing side walls 82 of processing space 80, whereby scalding medium exits as according to arrows $P_8$ (see FIG. 6B) in a direction toward poultry 83, The supply of scalding medium from standing side walls 82 is advantageous, among other reasons because it is hereby possible to also blow the scalding medium properly onto the wings directed toward these side walls 82; among others, the feathers on the wings are often difficult to remove in prior art scalding. The supply of the scalding medium to openings 88 in standing side walls 82 takes place through intermediate spaces 89 left clear for this purpose in the side walls.

As an alternative to the outflow openings 87, 88 in standing side walls 82 and the blower unit 85, is also possible to arrange separate pipes with nozzles in processing space 80. Such an alternative embodiment variant of a processing space 90 of a device according to the present invention is shown in FIG. 7. In addition to being provided with the elements already known from foregoing figures, such as two transport paths 91 for poultry 92, processing space 90 is also provided with a number of centrally disposed nozzles 93 and nozzles 94 disposed on the longitudinal sides of processing space 90. Nozzles 93, 94 are disposed such that they blow scalding medium onto poultry 92 from different heights and from different directions. It is optionally also possible to embody processing space 90 such that the position of nozzles 93, 94 is changed subject to the quality of the poultry 92 for processing.

It is noted, perhaps unnecessarily, that a processing space with a combination of blow pipes as shown in FIG. 7 and outflow openings 87, 88 and blower unit 85 as shown in FIG. 6 is also possible according to the present invention.

The invention claimed is:

1. A device for scalding poultry comprising a full plumage, comprising:
    a conditioning space for composing a partially or almost fully saturated scalding medium with a dew point lying in the range of 49-61° C., the dew point not to exceed a wet bulb temperature,
    a processing space provided with transport means which define a transport path for the poultry leading through the processing space, and
    dispensing means for the scalding medium connecting the conditioning space to the processing space and provided with at least one outlet opening which is directed toward the transport path and with which the composed scalding medium is carried from the conditioning space into the transport path, as a result of which liquid from the scalding medium condenses onto the poultry.

2. The device as claimed in claim 1, wherein the dispensing means for carrying the scalding medium into the transport path are provided with at least one adjustable outlet opening.

3. The device as claimed in claim 1, wherein the dispensing means for the scalding medium comprise at least one nozzle.

4. The device as claimed in claim 1, wherein the dispensing means for the scalding medium comprise heating.

5. The device as claimed in claim 1, wherein the processing space consists of a substantially tunnel-like space.

6. The device as claimed in claim 1, wherein the transport means comprise at least one overhead conveyor provided with poultry holders displaceable along the overhead conveyor.

7. The device as claimed in claim 1, wherein at least a part of the dispensing means is disposed relative to the transport means which define a transport path for the poultry leading through the processing space such that the dispensing means bring a part of the scalding medium in targeted contact with the underside of the wings of the poultry.

8. The device as claimed in claim 1, wherein the conditioning space for composing the scalding medium comprises at least one evaporation space with a feed for liquid.

9. The device as claimed in claim 8, wherein the conditioning space for composing the scalding medium comprises at least two evaporation spaces placed in line, both provided with a feed for liquid, wherein the feed for liquid on the first in-line evaporation space is adapted for operation at a higher temperature than the second evaporation space.

10. The device as claimed in claim 9, wherein the first in-line evaporation space is provided with a steam supply.

11. The device as claimed in claim 1, wherein the processing space is provided with discharge means for discharging condensation from the processing space.

12. The device as claimed in claim 1, wherein the device is provided with at least one sensor and a control, preferably a dew point control, communicating with the sensor.

13. A method for scalding poultry, comprising the processing steps of:
   A) composing a scalding medium with a dew point lying in the range of 49-61° C., the dew point not to exceed a wet bulb temperature, the scalding medium being partially or almost fully saturated when contacting the poultry;
   B) carrying into a processing space poultry for scalding which comprises full plumage; and
   C) supplying the scalding medium to the processing space such that at least one jet of the scalding medium is formed which is directed at the poultry.

14. The method as claimed in claim 13, wherein the jet of the scalding medium is directed at the skin of the poultry.

15. The method as claimed in claim 13, wherein when coming into contact with the skin of the poultry, the medium jet has a temperature higher than the dew point.

16. The method as claimed in claim 13, wherein the dew point of the scalding medium lies in the range of 49-53° C.

17. The method as claimed in claim 13, wherein the dew point of the scalding medium lies in the range of 53-57° C.

18. The method as claimed in claim 13, wherein the dew point of the scalding medium lies in the range of 57-61° C.

19. The method as claimed in claim 13, wherein the scalding medium is 90-100% saturated when it enters into contact with the poultry during processing step C).

20. The method as claimed in claim 13, wherein the jet of scalding medium is directed particularly at the neck of the poultry during processing step C).

21. The method as claimed in claim 13, wherein the jet of scalding medium is directed particularly at the wings of the poultry during processing step C).

22. The method as claimed in claim 13, wherein the jet of scalding medium is directed particularly at the belly of the poultry during processing step C).

23. The method as claimed in claim 13, wherein the jet of scalding medium is directed particularly at the tail of the poultry during processing step C).

24. The method as claimed in claim 13, wherein the jet of scalding medium is set per batch of poultry to be processed.

25. The method as claimed in claim 13, wherein the treatment time of the poultry, more particularly chickens, in the processing space lies in the range of 60-180 seconds.

26. The method as claimed in claim 13, wherein an airflow is generated in the processing space.

27. The method as claimed in claim 13, wherein condensed water is discharged out of the processing space.

28. The method as claimed in claim 27, wherein the condensed water discharged out of the processing space is reused to compose the scalding medium as according to processing step A).

* * * * *